(12) United States Patent
Pan et al.

(10) Patent No.: US 11,977,561 B2
(45) Date of Patent: May 7, 2024

(54) AUTOMATICALLY DETERMINING ITEMS TO INCLUDE IN A VARIANT GROUP

(71) Applicant: Walmart Apollo, LLC, Bentonville, AR (US)

(72) Inventors: Yanxin Pan, Sunnyvale, CA (US); Swagata Chakraborty, Santa Clara, CA (US); Abhinandan Krishnan, Sunnyvale, CA (US); Abon Chaudhuri, Sunnyvale, CA (US); Aakash Mayur Mehta, San Francisco, CA (US); Edison Mingtao Zhang, San Francisco, CA (US); Kyu Bin Kim, Mountain View, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 370 days.

(21) Appl. No.: 16/779,473

(22) Filed: Jan. 31, 2020

(65) Prior Publication Data

US 2021/0240739 A1 Aug. 5, 2021

(51) Int. Cl.
*G06F 16/28* (2019.01)
*G06F 16/2455* (2019.01)
(Continued)

(52) U.S. Cl.
CPC ...... *G06F 16/285* (2019.01); *G06F 16/24553* (2019.01); *G06N 3/044* (2023.01);
(Continued)

(58) Field of Classification Search
CPC ............ G06F 16/285; G06F 16/24553; G06N 3/0445; G06N 3/0454; G06N 3/08; G06Q 30/0603; G06Q 30/0641; G06Q 30/00
See application file for complete search history.

(56) References Cited

U.S. PATENT DOCUMENTS

| 9,646,262 B2 | 5/2017 | Phillipps et al. |
| 9,953,357 B2 | 4/2018 | Ainsworth, III et al. |

(Continued)

*Primary Examiner* — Etienne P Leroux
*Assistant Examiner* — Farhad Agharahimi
(74) *Attorney, Agent, or Firm* — BRYAN CAVE LEIGHTON PAISNER LLP

(57) ABSTRACT

A method including obtaining image data and attribute information of a first item in an item catalog. The method also can include generating candidate variant items from the item catalog for the first item using a combination of (a) a k-nearest neighbors approach to search for first candidate variant items based on text embeddings for the attribute information of the first item, and (b) an elastic search approach to search for second candidate variant items based on image embeddings for the image data of the first item. The method additionally can include performing respective classifications based on respective pairs comprising the first item and each of the candidate variant items to filter the candidate variant items. The method further can include determining a respective distance between the first item and each of the candidate variant items, as filtered. The method additionally can include determining one or more items in the candidate variant items, as filtered, to include in a variant group for the first item, based on a decision function using a predetermined threshold and the respective distance for the each of the candidate variant items, as filtered. Other embodiments are described.

20 Claims, 4 Drawing Sheets

(51) Int. Cl.
  *G06N 3/044* (2023.01)
  *G06N 3/045* (2023.01)
  *G06N 3/08* (2023.01)
  *G06Q 30/0601* (2023.01)

(52) U.S. Cl.
  CPC .............. *G06N 3/045* (2023.01); *G06N 3/08* (2013.01); *G06Q 30/0603* (2013.01); *G06Q 30/0641* (2013.01)

(56) References Cited

U.S. PATENT DOCUMENTS

| | | | |
|---|---|---|---|
| 10,387,900 B2 | 8/2019 | Bledsoe et al. | |
| 10,664,512 B1 | 5/2020 | He et al. | |
| 11,250,042 B2 | 2/2022 | Chang et al. | |
| 2011/0264641 A1* | 10/2011 | Yang | G06F 16/51 |
| | | | 707/706 |
| 2015/0039473 A1* | 2/2015 | Hu | G06F 16/9535 |
| | | | 705/26.62 |
| 2015/0199324 A1* | 7/2015 | Nishioka | G06F 40/177 |
| | | | 715/212 |
| 2015/0379117 A1* | 12/2015 | Kalinin | G16B 40/30 |
| | | | 707/737 |
| 2016/0078507 A1* | 3/2016 | Shivaswamy | G06Q 30/0629 |
| | | | 705/26.2 |
| 2016/0148222 A1* | 5/2016 | Davar | G06Q 50/01 |
| | | | 705/7.32 |
| 2016/0189286 A1* | 6/2016 | Zohar | G06F 3/005 |
| | | | 348/150 |
| 2016/0196350 A1* | 7/2016 | Mau | G06F 16/951 |
| | | | 707/706 |
| 2017/0193545 A1* | 7/2017 | Zhou | G06Q 30/0254 |
| 2018/0218429 A1 | 8/2018 | Guo et al. | |
| 2019/0065589 A1 | 2/2019 | Wen et al. | |
| 2019/0377825 A1* | 12/2019 | Chang | G06F 16/328 |
| 2020/0311108 A1* | 10/2020 | Kumar | G06F 16/287 |
| 2021/0049664 A1* | 2/2021 | Lundgaard | G06F 16/90344 |
| 2021/0073890 A1* | 3/2021 | Lee | G06N 20/20 |

* cited by examiner

AUTOMATICALLY DETERMINING ITEMS TO INCLUDE IN A VARIANT GROUP

TECHNICAL FIELD

This disclosure relates generally to automatically determining items to include in a variant group.

BACKGROUND

Items in an online items catalog can be variants each other. For example, a certain model of shag area rug can be offered in multiple different size and/or colors. Such variants are sometimes not grouped together in a variant group.

BRIEF DESCRIPTION OF THE DRAWINGS

To facilitate further description of the embodiments, the following drawings are provided in which.

Figure 1:
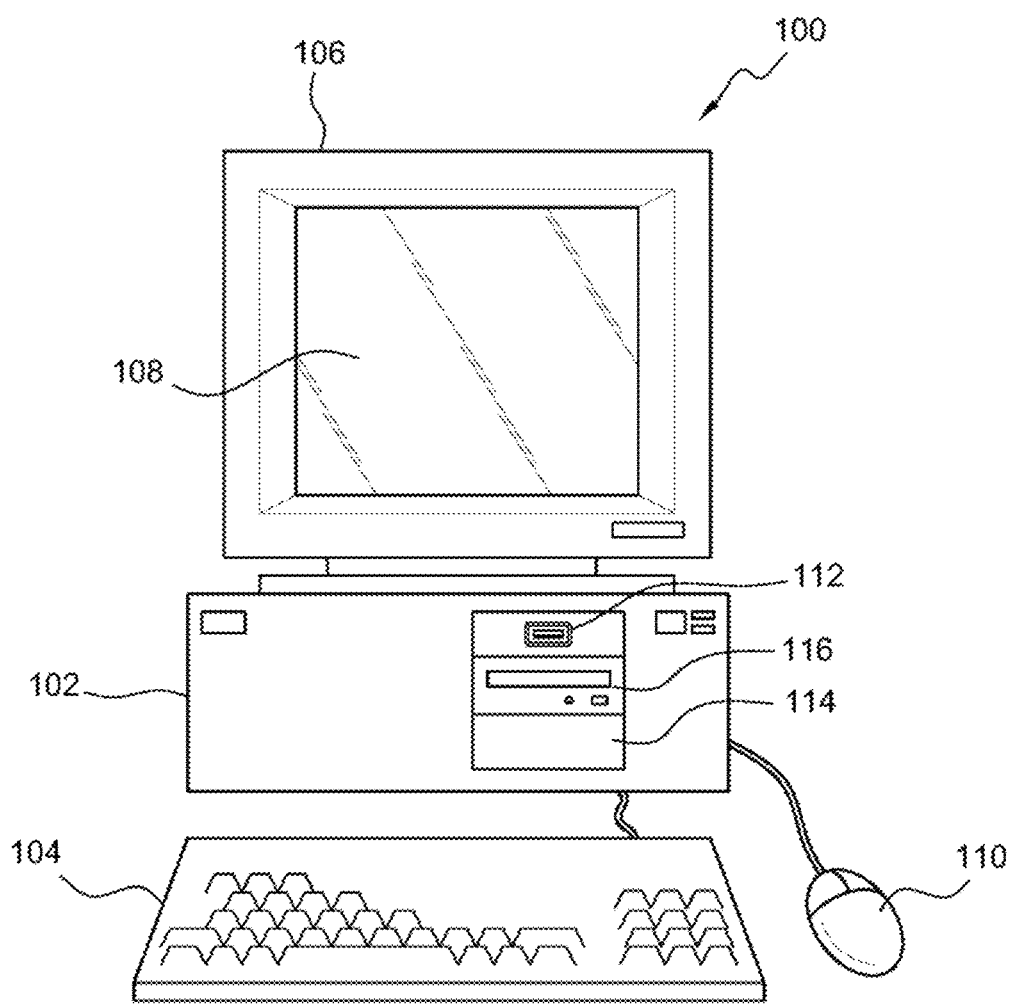
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Figure 2:
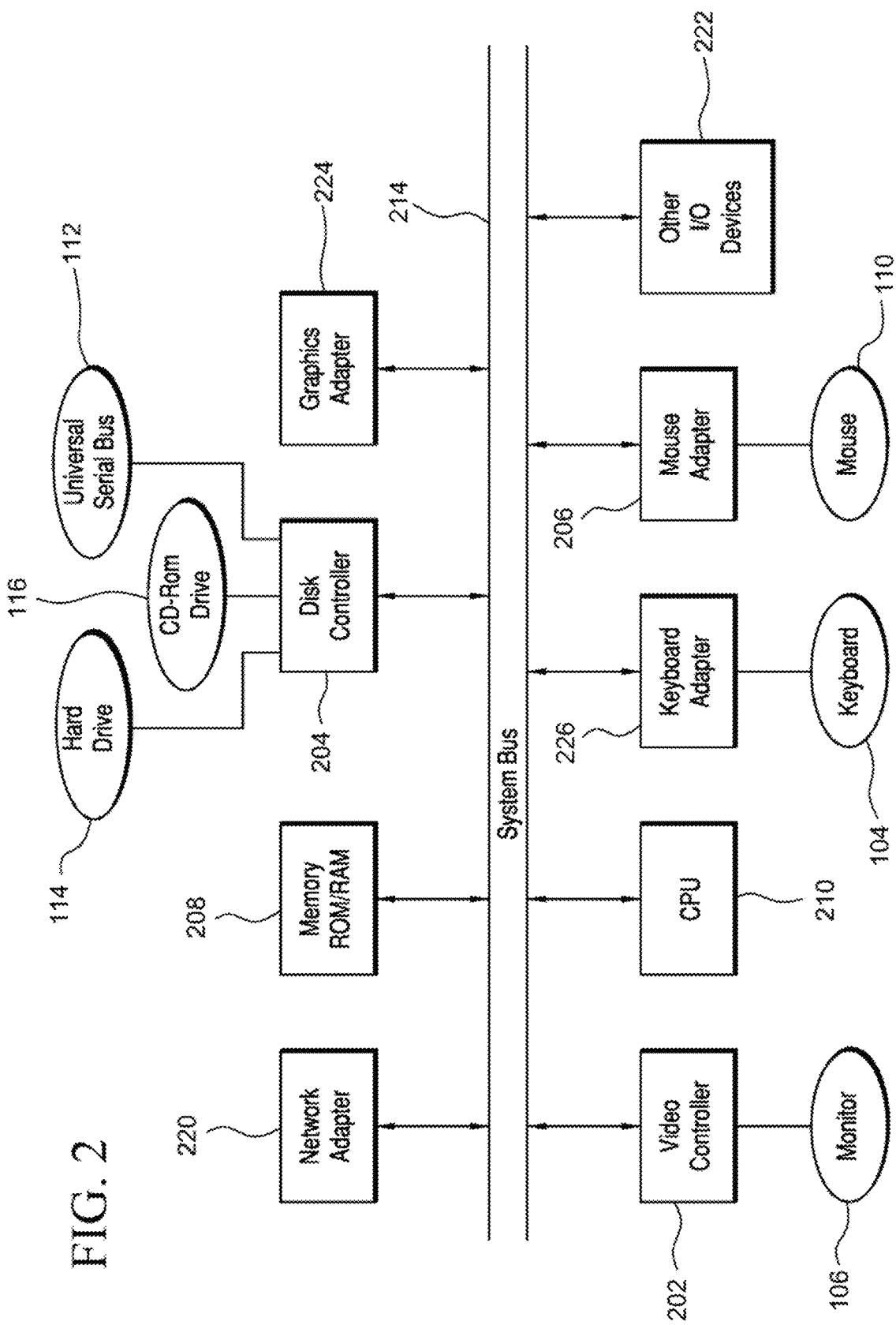
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s)

that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIGS. 1-2). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
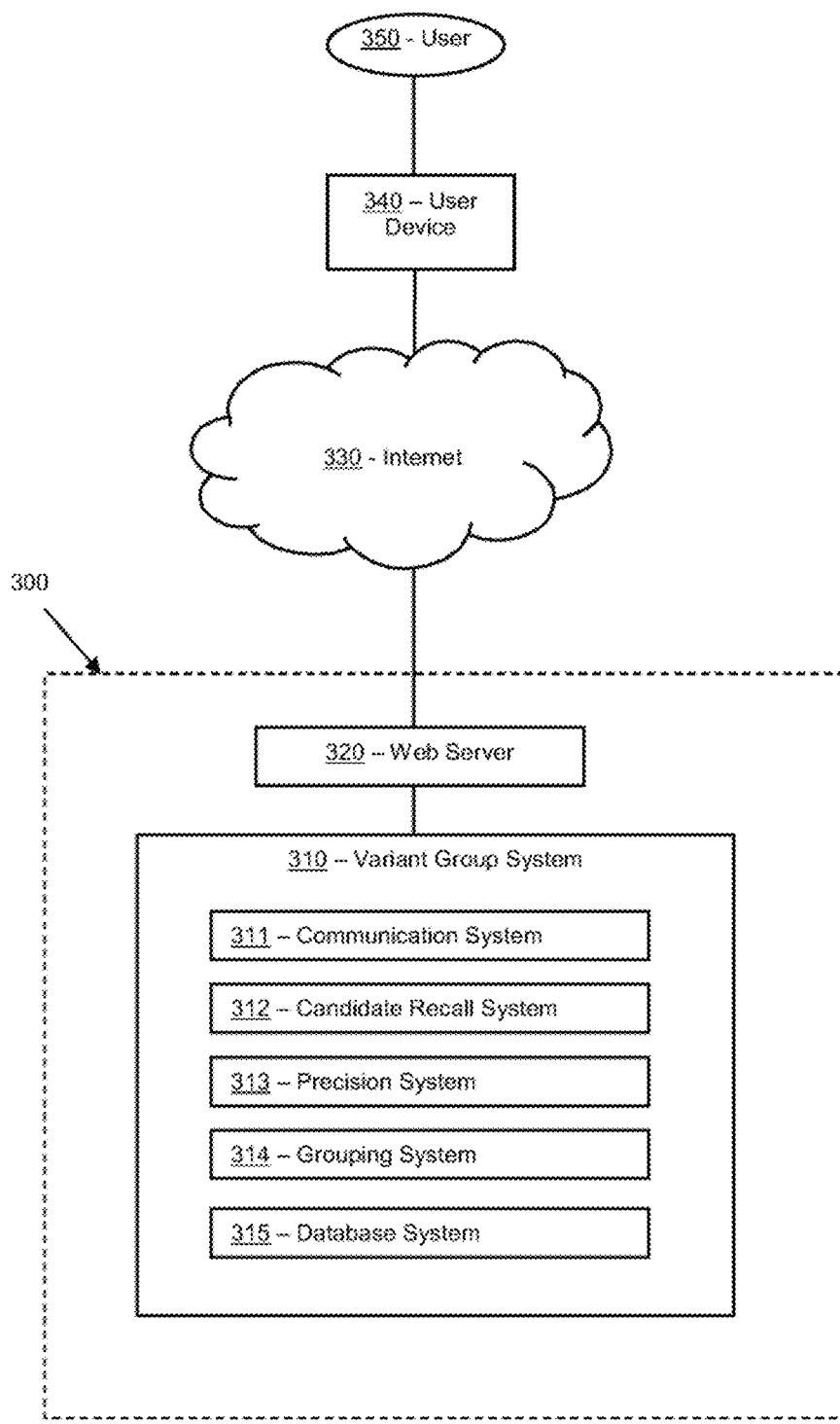
FIG. 3 illustrates a block diagram of a system that can be employed for automatically determining items to include in a variant group, according to an embodiment.

Turning ahead in the drawings, FIG. 3 illustrates a block diagram of a system 300 that can be employed for automatically determining items to include in a variant group, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include a variant group system 310 and/or web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Variant group system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host variant group system 310 and/or web server 320. Additional details regarding variant group system 310 and/or web server 320 are described herein.

In some embodiments, web server 320 can be in data communication through Internet 330 with one or more user devices, such as a user device 340. User device 340 can be part of system 300 or external to system 300. In some embodiments, user device 340 can be used by users, such as a user 350. In many embodiments, web server 320 can host one or more websites and/or mobile application servers. For example, web server 320 can host a website, or provide a server that interfaces with an application (e.g., a mobile application), on user device 340, which can allow users to browse and/or search for items (e.g., products), to add items to an electronic cart, and/or to purchase items, in addition to other suitable activities. In a number of embodiments, web server 320 can host a website, or provide a server that interfaces with an application, on user device 340, which can allow other users, such as source (e.g., suppliers), to upload information about items that are being sold through web server 320. For example, users 340 can upload items and/or item information (e.g., attribute values for items), such that the items can be sold using web server 320.

In some embodiments, an internal network that is not open to the public can be used for communications between variant group system 310 and web server 320 within system 300. Accordingly, in some embodiments, variant group system 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, a mobile device, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Wash., United States of America.

In many embodiments, variant group system 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to variant group system 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of variant group system 310 and/or web server 320. In a similar manner, the processors and/or the non-transitory computer-readable media can be local and/or remote to each other.

Meanwhile, in many embodiments, variant group system 310 and/or web server 320 also can be configured to communicate with one or more databases, such as a database system 315. The one or more databases can include a product database that contains information about products, items, or SKUs (stock keeping units), for example, including attribute names and attribute values, among other information, as described below in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, variant group system 310, web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, variant group system 310 can include a communication system 311, a candidate recall system 312, a precision system 313, a grouping system 314, and/or database system 315. In many embodiments, the systems of variant group system 310 can be modules of computing instructions (e.g., software modules) stored at non-transitory computer readable media that operate on one or more processors. In other embodiments, the systems of variant group system 310 can be implemented in hardware. Variant group system 310 and/or web server 320 each can be a computer system, such as computer system 100 (FIG. 1), as described above, and can be a single computer, a single server, or a cluster or collection of computers or servers, or a cloud of computers or servers. In another embodiment, a single computer system can host variant group system 310 and/or web server 320. Additional details regarding variant group system 310 the components thereof are described herein.

In many embodiments, variant group system 310 can use machine learning models to automatically create and/or suggest base variant groups from items provided by one or more sources (e.g., supplier), which can advantageously assist users in selecting items from among variants. When a source uploads an item, it generally provides an identifier global trade identifier (GTID), universal product code (UPC), and/or other identifier, which can be a unique identifier for identifying the idem. Such identifiers can be designed to be unique for each product. When multiple sources provide the same item, a tenant can be the combination of the sources that provide the item. Variants of an item, such as size and/or color variants, can be designed to not be included as the same item and/or same tenant. It can be advantageous to include variants of an item in a base variant group. When an item is shown on a webpage provided by web server 320 to a user (e.g., a customer), it can be beneficial to show variants of the item on the same page, so that the user can readily select among the items in the base variant group, such as among different colors or sizes of the item.

For online shopping platforms that host a large number of items, such as over 200 million unique items, the scale of the item catalog can be massive. With hundreds or thousands of updates to the items being received daily, groups of humans are unable to review and validate groupings for base variant groups. In many embodiments, variant group system 310 can provide a technology-based solution to automatically determine items to include in a variant group. These variant groups can be suggested to groups of humans to review, and/or can be used without human review.

Figure 4:
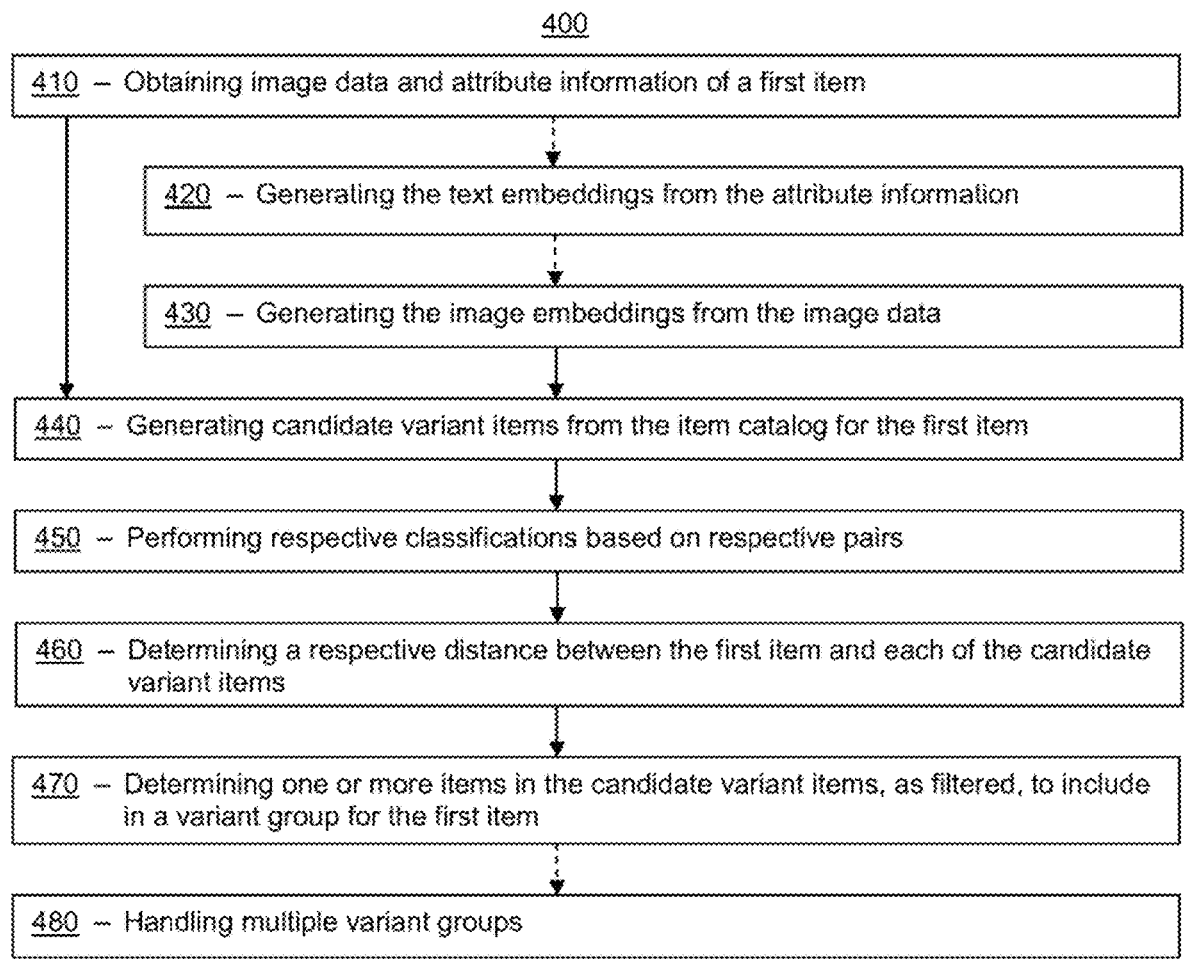
FIG. 4 illustrates a flow chart for a method, according to an embodiment.

Turning ahead in the drawings, FIG. 4 illustrates a flow chart for a method 400, according to an embodiment. In some embodiments, method 400 can be a method of automatically determining items to include in a variant group. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3), variant group system 310 (FIG. 3), and/or web server 320 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of system 300. The processor(s) can be similar or identical to the processor(s) described above with respect to computer system 100 (FIG. 1).

In some embodiments, method 400 and other blocks in method 400 can include using a distributed network including distributed memory architecture to perform the associated activity. This distributed architecture can reduce the impact on the network and system resources to reduce congestion in bottlenecks while still allowing data to be accessible from a central location.

Referring to FIG. 4, method 400 can include a block 410 of obtaining image data and attribute information of a first item in an item catalog. For example, an item in an item catalog can include one or more images that are associated with the item and/or attribute information, such as product type, brand, size, color, and/or other suitable attribute values.

In some embodiments, method 400 optionally can include one or more pre-processing activities, such as blocks 420 and 430, described below. In other embodiments, method 400 can continue after block 410 with a block 440, described below.

In a number of embodiments, method 400 optionally can include block 420 of generating text embeddings from the attribute information of the first item. In many embodiments, the text embeddings can be generated using an LSTM (long short-term memory) model, such as in a recurrent neural network (RNN). The LSTM model can convert one or more of the pieces of attribute information (e.g., product type, brand, size, color, etc.) into text embeddings in the LSTM feature space. In several embodiments, the attribute information for other items in the item catalog can be similarly pre-processed to generate text embeddings for those items, which can be used in block 440, described below.

In several embodiments, method 400 further optionally can include a block 430 of generating the image embeddings from the image data of the first item. In many embodiments, the image embeddings can be generated using a suitable image embeddings model, such as the VGG16 (Visual Geometry Group (VGG) 16 layer) model. The VGG16 model was described by K. Simonyan and A. Zisserman of the University of Oxford, and is a convolutional neural network model with 16 layers for classification and/or detection of images. In a number of embodiments, the VGG16 model can convert an image into image embeddings in the VGG feature space. In several embodiments, the image data for other items in the item catalog can be similarly pre-processed to generate image embeddings for those items, which can be used in block 440, described below.

In a number of embodiments, method 400 also can include block 440 of generating candidate variant items from the item catalog for the first item using a combination of (a) a k-nearest neighbors approach to search for first candidate variant items based on text embeddings for the attribute information of the first item, and (b) an elastic search approach to search for second candidate variant items based on image embeddings for the image data of the first item. In a number of embodiments, block 400 can be a high recall model, which can be aimed at returning most of the relevant results, as opposed to a high precision model (such as implemented in blocks 450-460 described below), which can be aimed at returning more relevant results than irrelevant results. In a number of embodiments, the k-nearest neighbors approach can include using a non-metric space library (NMSLIB). For example, NMSLIB can be used to search for items in the item catalog that are textually similar to the first item. In some embodiments, the k-nearest neighbors approach (e.g., NMSLIB) can be based on comparing the text embeddings associated with the first item and/or the items in the item catalog in the LSTM space.

In several embodiments, the elastic search approach can be used to search for items in the item catalog that have images similar to one or more images of the first item. In some embodiments, the elastic search approach can be based on comparing the image embeddings associated with the first item and/or the items in the item catalog in the VGG feature space.

In a number of embodiments, the combination used to generate the candidate variant items can include a union of the first candidate variant items generated using the k-nearest neighbors approach and the second candidate variant items generated using the elastic search approach. Testing on various product types has indicated that combining the two approaches (e.g., the text-based approach and the image-based approach) can include the recall of items that can be relevant over approaches that use a single one of the two approaches.

In several embodiments, method 400 additionally can include a block 450 of performing respective classifications based on respective pairs comprising the first item and each of the candidate variant items to filter the candidate variant items. In a number of embodiments, the respective classifications can be performed using a logistic regression model with L1 regularization based on respective product type classification embeddings for the candidate variant items. In a number of embodiments, the logistic regression model can be a shallow classifier. In several embodiments, the logistic regression model can be trained on pairs of items (e.g., pairs of item identifiers). For example, a pair of items can include the first item and another item in the candidate variant items. Given an input pair of items, the logistic regression model can determine whether the pair is a variant, which can be labeled as label 1, or instead not a variant, which can be labeled as label 0. In many embodiments, the logistic regression model can be based embeddings generated for each of the items for the product type classification of the model. The logistic regression model can be a high precision model (as opposed to a high recall model described above in connection with block 440).

In several embodiments, the logistic regression model can be trained on product ids pairs with an L1 regularization technique (e.g., Lasso regression) to adjust the model weights on relevant features, to predict whether the pair is variant (label 1) or not (label 0). In many embodiments, the model beneficially can provide dimensionality reduction and/or weightage on the dimensions that relevant.

Various approaches to providing training data can be used. For example, in a first training data approach, curated data can be unavailable, so training data can be created from existing groups in the catalog. In such training data, not all product types may be well represented. For example, there can be 1316898 positive examples, which are random pairs created within selected groups, and there can be 1012630 Negative examples, which can be 50% with the same product type & brand, 35% within the same product type without the same brand, and 15% from random pairs from different groups. Additional hard negatives can be added through tf-idf (term frequency-inverse document frequency).

In another example, a second training data approach can include two sets of training data created with a combination of filtered training from the first training data approach described above, which can have multiple product types as in the first training data approach, and using tf-idf based hard pairs on various product types. In the first set for the second training data approach, there can be 90% sample training from the first training data approach, and 10% hard pairs, for a total of approximately 300 thousand. In the second set for the second training data approach, there can be 75% sample training from the first training data approach, and 25% hard pairs, for a total of approximately 600 thousand.

In many embodiments, hard pairs can be created by creating hard positive and hard negatives. Hard positives can be pairs that have significantly different titles, but are in fact variants. Hard negatives can be pairs that have very similar titles, but are in fact not variants.

In several embodiments, hard positives can be created from pairs with label 1 within groups if the ti-idf title similarity is lower than a predetermined threshold. This approach can capture true variants that have quite dissimilar titles. In some embodiments, this approach also can drop edge cases (e.g., absolutely dissimilar titles that are grouped together wrongly in the catalog (e.g., over-grouped)) as such cases can be unhelpful to train the model.

In a number of embodiments, hard negatives can be created from pairs with label 0 from different groups if the ti-idf title similarity is above a predetermined threshold. This approach can capture pairs that are not variants but have titles that look very similar and can fall within the same product line. In some embodiments, this approach also can drop the edge cases (e.g., exact titles that are not variants in the catalog (e.g., under-grouped), as they could have incorrect grouping in the catalog), as such cases can be unhelpful to train the model.

In several embodiments, tf-idf based pair creation can be limited to titles that are more than 3 words long for reliability and avoiding titles that do not have meanings and based on alphanumeric naming of merchandise. Edge cases based on tf-idf computation also can be dropped from the first training data approach to improve the quality of the samples taken from it. In many embodiments, a pair with an item from a golden dataset can be dropped to avoid leakage of information into training data.

In a number of embodiments, the golden dataset can be a dataset that is different from the training datasets, which can be used as a benchmark to evaluate the model after training to see how well the model performs, even as the model changes. For example, the golden dataset can include 1095 test groups across 4200 product types. In several example, the golden dataset can be manually created, such that data can been biased to high GMV (gross merchandise volume) items, as there can be a correlation between GMV and the reliability of the data, in some cases.

Evaluation of the first training data approach involved separating 30% of the training set pairs as a hold-out set. The precision was found to be 95.80%, the recall was found to be 97.38%, and the accuracy was found to be 96.95%.

Evaluation of the second training data approach involved pairs of the first training data approach that were selective sampled, and hard pairs based on title similarity of variants and non-variants were added. 30% of the training set pairs were separated as a hold-out set. The precision was found to be 83%, and the recall was found to be 82%

In a number of embodiments, method 400 further can include block 460 of determining a respective distance between the first item and each of the candidate variant items, as filtered. In many embodiments, the respective distance can be determined using a Siamese network. For example, the Siamese network can include two identical neural networks (e.g., twin neural networks) and one loss function module. The two identical neural networks share the same weight. The output of the Siamese network can be a distance, which can describe a measure of similarity or dissimilarity between the input pair. A large distance can mean the inputs are different, and a small distance can mean the inputs are similar. A threshold can be selected and used in a decision function, such that if the distance is smaller than the threshold, then the input pair can be predicted as variants, otherwise, they can be determined to not be variants. In testing, performance of the Siamese network model can be found to have a precision of 95.80%, a recall of 97.38%, and an accuracy of 96.95%. By combining blocks 450 and 460, the precision can beneficially be improved.

In several embodiments, method 400 additionally can include a block 470 of determining one or more items in the candidate variant items, as filtered, to include in a variant group for the first item, based on a decision function using a predetermined threshold and the respective distance for the each of the candidate variant items, as filtered. In many embodiments, if the distance is below the predetermined threshold, then the candidate variant item can be determined to be including in the variant group with the first item. In many embodiments, multiple candidate variant items can be included in the variant group with the first item. In some embodiments, the variant group can be used as a base variant group on the website provided by web server 320 (FIG. 3). In a number of embodiments, the variant group can be suggested to one or more human reviewers to evaluate the variant group for accuracy.

In some embodiments, when items are found to not be variants of each other, based on the decision function, but those items are included in the same base variant group, such item can be flagged for further review, to potentially be split from being included in the same base variant group.

In some embodiments, determining whether items are variants of each other can be used to detect inconsistencies in product type data for items. For example, there can be five items, in which four of the items have a product type of "Polos" listed in the item catalog, and a fifth item has a product type of "Hats" listed in the item catalog. If all of these items have been included in a base variant group, the base variant group can be flagged for review as having inconsistent product type data. The techniques described herein can determine that these products all are variants, for example, in which case the label of "Hats" for the product type of for the fifth item can be flagged as inconsistent, to be corrected.

In a number of embodiments, method 400 optionally can include a block 480 of handling multiple variant groups. In a number of embodiments, multiple variant groups can be generated, similarly to the approach of generating a variant group described above. As an example, item IDs 1, 2, 3, 4, 5, 6, 10, 15, 35 can be different nail polish item identifiers, which can potentially be grouped together. The techniques described above can be used to suggest multiple variant groups, as listed below in Table 1, in which each row is a suggested variant group. Sending all of these groups for manual review can use extra resources in terms of cost and effort to review many groups.

TABLE 1

| Group No. | Group members |
|---|---|
| 1 | 1, 2, 3 |
| 2 | 1, 2, 4 |

TABLE 1-continued

| Group No. | Group members |
|---|---|
| 3 | 1, 2, 3, 4 |
| 4 | 3, 4, 5, 6 |
| 5 | 5, 6 |
| 6 | 1, 2 |
| 7 | 10, 5 |
| 8 | 1, 2, 3, 5, 15 |
| 9 | 1, 2, 3, 4 |

In a number of embodiments, block 480 of handling multiple variant groups can include determining a coherence score for the variant group to select one or more supergroups from among multiple variant groups. The multiple variant groups can include the variant group. It can be beneficial to narrow down the number of groups, yet include most of the variants items. For example, in order to prioritize which variant groups to use, higher confidence groups can be selected for manual review to gauge the accuracy of the variant groupings. As there can be multiple groups with partial or complete overlap, superset groups with a high coherence score can be prioritized. If a unique group is a superset of multiple smaller subset groups, then this supergroup has a higher recall for variants, and it can be selected for review. This determination can be based on a coherence score, in which the higher the coherence score, the higher the priority for selecting the variant group, in which coherence score is defined as:

Coherence score=(# of smaller groups that are contained by the supergroup)/(supergroup size)

Based on coherence scores, the supergroups can be selected as shown in Table 2, in which each row is a supergroup.

TABLE 2

| Group No. | Group members | Group Size | Group Frequency | Coherence Score |
|---|---|---|---|---|
| 3 | 1, 2, 3, 4 | 4 | 6 | 1.5 |
| 4 | 3, 4, 5, 6 | 4 | 2 | 0.5 |
| 7 | 10, 5 | 2 | 1 | 0.5 |
| 8 | 1, 2, 3, 5, 15 | 5 | 5 | 1.0 |

In some embodiments, groups to be selected from the supergroups can be groups having a coherence score higher than a threshold, such as 0.8., such that groups 3 and 8 can be selected.

In a number of embodiments, block 480 of handling multiple variant groups can include determining a Jaccard similarity score between multiple variant groups. In some cases, the groups selected can have a partial overlap, such as in groups 3 and 8, even though these groups have high coherence scores, but they are not subsets of each other. In a number of embodiments, the Jaccard similarity scores can be determined, as follows:

Jaccard Similarity=(size of the set intersection of the items in the two groups)/(size of the set union of the items in the two groups)

The Jaccard similarity score for groups 3 and 8 can be 3/6=0.5. In a number of embodiments, a threshold can be used for the Jaccard similarity score to determine whether to merge these two groups together and send for review as a single group, or instead to keep as separate groups. In this case, the threshold can be high enough that the groups are merged, into a single group including items 1, 2, 3, 4, 5, and 15.

In another example, the groups in Table 3 can be selected as supergroups using the coherence scores, in which there are two groups with an overlap of a single item, item 91, which can possibly by a false grouping by the model in the second group.

TABLE 3

| Group No. | Group members |
|---|---|
| 1 | 90, 91, 92 |
| 2 | 91, 100, 101, 102, 103, 104, 105, 106 |

The Jaccard similarity score can be determined here as 1/10=0.1, which can be a low value, which can indicate to keep the groups separate as independent groups. During manual review, it is possible that item 91 will be dropped from the second group, in which case the groups of items will be as shown in Table 4 after the manual review.

TABLE 4

| Group No. | Group members |
|---|---|
| 1 | 90, 91, 92 |
| 2 | 100, 101, 102, 103, 104, 105, 106 |

Returning to FIG. 3, in several embodiments, communication system 311 can at least partially perform block 410 (FIG. 4) of obtaining image data and attribute information of a first item in an item catalog.

In several embodiments, candidate recall system 312 can at least partially perform block 420 (FIG. 4) of generating text embeddings from the attribute information of the first item; and/or block 430 (FIG. 4) of generating the image embeddings from the image data of the first item; block 440 (FIG. 4) of generating candidate variant items from the item catalog for the first item using a combination of (a) a k-nearest neighbors approach to search for first candidate variant items based on text embeddings for the attribute information of the first item, and (b) an elastic search approach to search for second candidate variant items based on image embeddings for the image data of the first item In a number of embodiments, precision system 313 can at least partially perform block 450 (FIG. 4) of performing respective classifications based on respective pairs comprising the first item and each of the candidate variant items to filter the candidate variant items; and/or block 460 (FIG. 4) of determining a respective distance between the first item and each of the candidate variant items, as filtered.

In several embodiments, grouping system 314 can at least partially perform block 470 (FIG. 4) of determining one or more items in the candidate variant items, as filtered, to include in a variant group for the first item, based on a decision function using a predetermined threshold and the respective distance for the each of the candidate variant items, as filtered; and/or block 480 (FIG. 4) of handling multiple variant groups.

In many embodiments, the techniques described herein can provide a practical application and several technological improvements. In some embodiments, the techniques described herein can provide for automatically determining items to include in a variant group. These techniques described herein can provide a significant improvement over conventional approaches of using human curation for determining base variant groups. In a number of embodiments, the techniques described herein can detect inaccurate data (e.g., incorrect product type of an item in a base variant group), and in some embodiments can suggest a corrected value.

In many embodiments, the techniques described herein can be used continuously at a scale that cannot be handled using manual techniques. For example, the number of unique items can be over 200 million, and there can be hundreds or thousands of updates to items that are received daily.

In a number of embodiments, the techniques described herein can solve a technical problem that arises only within the realm of computer networks, as online ordering with variant groups do not exist outside the realm of computer networks. Moreover, the techniques described herein can solve a technical problem that cannot be solved outside the context of computer networks. Specifically, the techniques described herein cannot be used outside the context of computer networks, in view of a lack of data, and the machine learning models cannot be performed outside the context of computers.

Various embodiments can include a system including one or more processors and one or more non-transitory computer-readable media storing computing instructions configured to run on the one or more processors and perform certain acts. The acts can include obtaining image data and attribute information of a first item in an item catalog. The acts also can include generating candidate variant items from the item catalog for the first item using a combination of (a) a k-nearest neighbors approach to search for first candidate variant items based on text embeddings for the attribute information of the first item, and (b) an elastic search approach to search for second candidate variant items based on image embeddings for the image data of the first item. The acts additionally can include performing respective classifications based on respective pairs comprising the first item and each of the candidate variant items to filter the candidate variant items. The acts further can include determining a respective distance between the first item and each of the candidate variant items, as filtered. The acts additionally can include determining one or more items in the candidate variant items, as filtered, to include in a variant group for the first item, based on a decision function using a predetermined threshold and the respective distance for the each of the candidate variant items, as filtered.

A number of embodiments can include a method being implemented via execution of computing instructions configured to run at one or more processors and stored at one or more non-transitory computer-readable media. The method can include obtaining image data and attribute information of a first item in an item catalog. The method also can include generating candidate variant items from the item catalog for the first item using a combination of (a) a k-nearest neighbors approach to search for first candidate variant items based on text embeddings for the attribute information of the first item, and (b) an elastic search approach to search for second candidate variant items based on image embeddings for the image data of the first item. The method additionally can include performing respective classifications based on respective pairs comprising the first item and each of the candidate variant items to filter the candidate variant items. The method further can include determining a respective distance between the first item and each of the candidate variant items, as filtered. The method additionally can include determining one or more items in the candidate variant items, as filtered, to include in a variant group for the first item, based on a decision function using a predetermined threshold and the respective distance for the each of the candidate variant items, as filtered.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although automatically determining items to include in a variant group has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-4 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders. As another example, the systems within system 300 and/or variant group system 310 in FIG. 3 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when executed on the one or more processors, cause the one or more processors to perform operations comprising:
obtaining image data and attribute information of a first item in an item catalog;
generating candidate variant items from the item catalog for the first item using a combination of (a) a k-nearest neighbors approach to search for first ones of the candidate variant items based on text embeddings for the attribute information of the first item, and (b) an elastic search approach to search for second ones of the candidate variant items based on image embeddings for the image data of the first item;
performing respective classifications based on respective pairs comprising the first item and each of the first ones and the second ones of the candidate variant items to filter the candidate variant items;
determining a respective distance between the first item and each of the first ones and the second ones of the candidate variant items, as filtered;
determining one or more items in the first ones and the second ones of the candidate variant items, as filtered, to include in a variant group for the first item, based on a decision function using a predetermined threshold and the respective distance for each of the first ones and the second ones of the candidate variant items, as filtered, wherein when the respective distance is below the predetermined threshold, determining the one or more items comprises the one or more items of the first ones and the second ones of the candidate variant items in the variant group for the first item, wherein the variant group for the first item is used at least in part as a same base variant group on a website, and wherein the same base variant group and the variant group for the first item is displayed on a webpage on the website; and
determining whether at least one of one or more respective items included in the same base variant group is a variant of another of the items included in the same base variant group by automatically detecting inconsistencies in product type data listed in the item catalog for the one or more respective items in the same base variant group on the website, wherein the inconsistencies comprise different product types within the same base variant group; and wherein the inconsistencies further comprise hard negatives in which respective pairs of items in the same base variant group have similar titles but are not variants of the same base variant group.

2. The system of claim 1, wherein the computing instructions, when executed on the one or more processors, further cause the one or more processors to perform operations comprising:
before generating the candidate variant items, performing a pre-processing comprising:
generating the text embeddings from the attribute information of the first item; and
generating the image embeddings from the image data of the first item; and
splitting each non-variant item of the one or more respective items from the same base variant group on the website.

3. The system of claim 2, wherein:
the text embeddings are generated using an LSTM model.

4. The system of claim 2, wherein:
the image embeddings are generated using a VGG16 model.

5. The system of claim 1, wherein:
the k-nearest neighbors approach comprises using a non-metric space library (NMSLIB); and
the inconsistencies further comprise a different brand.

6. The system of claim 1, wherein:
the combination comprises a union of the first ones of the candidate variant items generated using the k-nearest neighbors approach and the second ones of the candidate variant items generated using the elastic search approach.

7. The system of claim 1, wherein performing the respective classifications further comprises:
performing the respective classifications using a logistic regression model with L1 regularization based on respective product type classification embeddings for the candidate variant items.

8. The system of claim 1, wherein determining the respective distance further comprises:
determining the respective distance using a Siamese network.

9. The system of claim 1, wherein the computing instructions, when executed on the one or more processors, further cause the one or more processors to perform an operation comprising:
determining a coherence score for the variant group to select one or more supergroups from among multiple variant groups, wherein the multiple variant groups comprise the variant group.

10. The system of claim 1, wherein the computing instructions, when executed on the one or more processors, further cause the one or more processors to perform an operation comprising:
determining a Jaccard similarity score between multiple variant groups, wherein the multiple variant groups comprise the variant group.

11. A method being implemented via execution of computing instructions configured to run at one or more processors stored on one or more non-transitory computer-readable media, the method comprising:
obtaining image data and attribute information of a first item in an item catalog;
generating candidate variant items from the item catalog for the first item using a combination of (a) a k-nearest neighbors approach to search for first ones of the candidate variant items based on text embeddings for the attribute information of the first item, and (b) an elastic search approach to search for second ones of the candidate variant items based on image embeddings for the image data of the first item;
performing respective classifications based on respective pairs comprising the first item and each of the first ones and the second ones of the candidate variant items to filter the candidate variant items;

determining a respective distance between the first item and each of the first ones and the second ones of the candidate variant items, as filtered;

determining one or more items in the first ones and the second ones of the candidate variant items, as filtered, to include in a variant group for the first item, based on a decision function using a predetermined threshold and the respective distance for each of the first ones and the second ones of the candidate variant items, as filtered, wherein when the respective distance is below the predetermined threshold, determining the one or more items comprises the one or more items of the first ones and the second ones of the candidate variant items in the variant group for the first item, wherein the variant group for the first item is used at least in part as a same base variant group on a website, and wherein the same base variant group and the variant group for the first item is displayed on a webpage on the website; and determining whether at least one of one or more respective items included in the same base variant group is a variant of another of the items included in the same base variant group by automatically detecting inconsistencies in product type data listed in the item catalog for the one or more respective items in the same base variant group on the web site, wherein the inconsistencies comprise different product types within the same base variant group; and wherein the inconsistencies further comprise hard negatives in which respective pairs of items in the same base variant group have similar titles but are not variants of the same base variant group.

12. The method of claim 11, further comprising:
before generating the candidate variant items, performing a pre-processing comprising:
generating the text embeddings from the attribute information of the first item; and
generating the image embeddings from the image data of the first item; and
splitting each non-variant item of the one or more respective items from the same base variant group on the website.

13. The method of claim 12, wherein:
the text embeddings are generated using an LSTM model.

14. The method of claim 12, wherein:
the image embeddings are generated using a VGG16 model.

15. The method of claim 11, wherein:
the k-nearest neighbors approach comprises using a non-metric space library (NMSLIB); and
the inconsistencies further comprise a different brand.

16. The method of claim 11, wherein:
the combination comprises a union of the first ones of the candidate variant items generated using the k-nearest neighbors approach and the second ones of the candidate variant items generated using the elastic search approach.

17. The method of claim 11, wherein performing the respective classifications further comprises:
performing the respective classifications using a logistic regression model with L1 regularization based on respective product type classification embeddings for the candidate variant items.

18. The method of claim 11, wherein determining the respective distance further comprises:
determining the respective distance using a Siamese network.

19. The method of claim 11, further comprising:
determining a coherence score for the variant group to select one or more supergroups from among multiple variant groups, wherein the multiple variant groups comprise the variant group.

20. The method of claim 11, further comprising:
determining a Jaccard similarity score between multiple variant groups, wherein the multiple variant groups comprise the variant group.

* * * * *